Nov. 19, 1940.  E. A. BAERER  2,222,392
DUPLICATING GRINDER
Filed Feb. 27, 1940
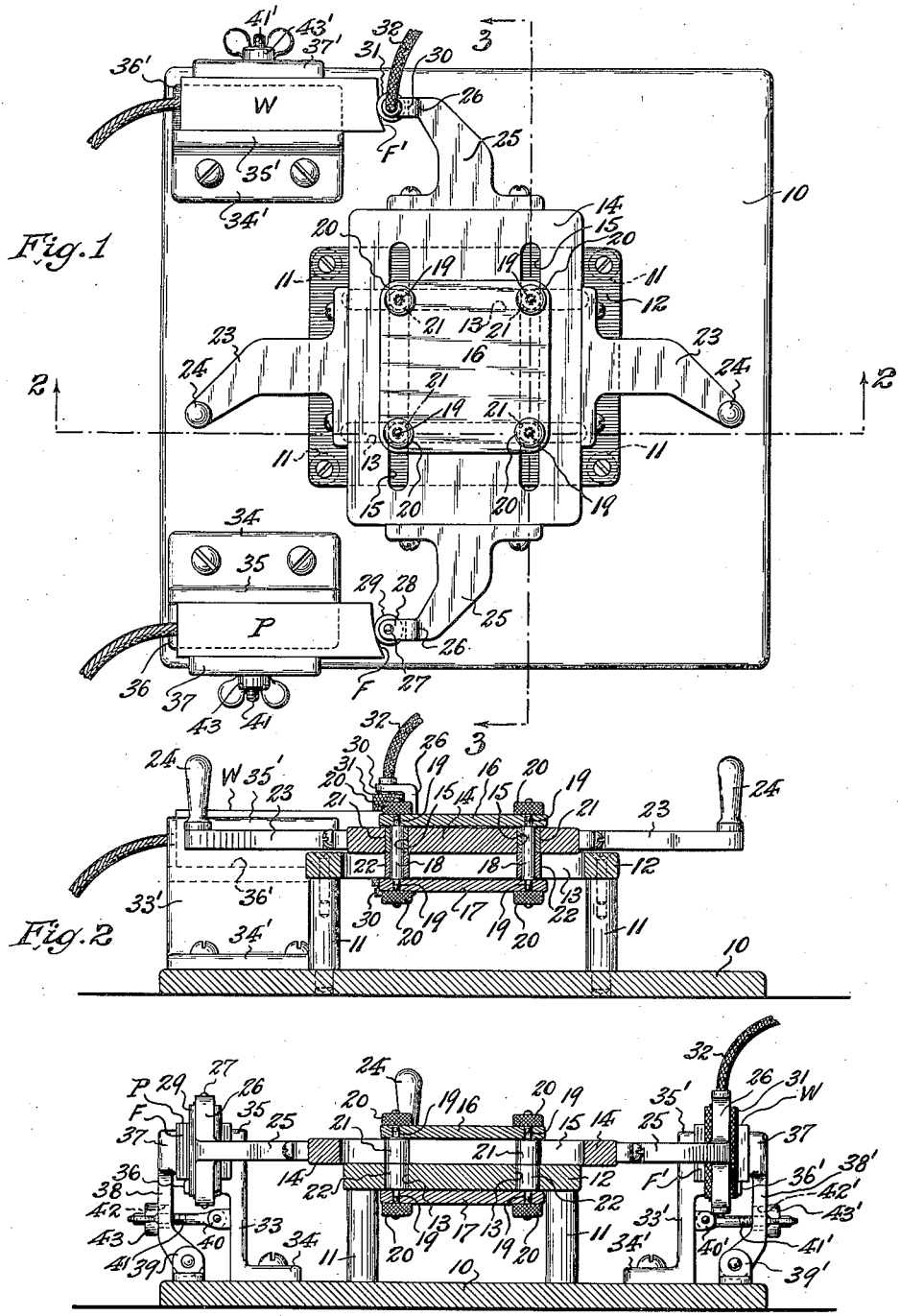
INVENTOR.
Eugene A. Baerer,
BY George D. Richards,
ATTORNEY.

Patented Nov. 19, 1940

2,222,392

UNITED STATES PATENT OFFICE 2,222,392

DUPLICATING GRINDER

Eugene A. Baerer, Ridgefield, N. J.

Application February 27, 1940, Serial No. 320,990

5 Claims. (Cl. 51—100)

This invention relates, generally, to improved grinding apparatus for duplicating in work operated upon the conformation of a specimen, model or pattern of the article, thing or part desired to be duplicated; and the invention has reference, in its more specific aspects, to a novel grinding apparatus for dressing the contact end faces of commutator brushes of electric generators, motors or the like, whereby the same may be pre-shaped to conform to the circumferential curvature of commutators, collector rings or the like upon which they are to run.

The present invention has for an object to provide a novel, simple and easily operated apparatus for the purposes stated, wherein devices are provided for mounting and holding in fixed spaced relation a specimen, model or pattern of the article to be duplicated and the work to be operated upon, and wherein a manipulatable carriage capable of universal movement in a single plane is provided, said carriage being provided with a tracer element engageable with said specimen, model or pattern and with a power actuated grinding tool simultaneously engageable with the work to be operated upon.

Other objects of this invention, not at this time more particularly enumerated, will be understood from the following detailed description of the same.

An illustrative embodiment of this invention is shown in the accompanying drawing, in which:—

Fig. 1 is a top plan view of the novel duplicating grinder made according to the instant invention; Fig. 2 is a longitudinal vertical sectional view thereof, taken on line 2—2 in Fig. 1; and Fig. 3 is a transverse vertical sectional view thereof, taken on line 3—3 in Fig. 1.

Similar characters of reference are employed in the above described views, to indicate corresponding parts.

Referring to the drawing, the reference character 10 indicates the base plate of the apparatus. Supported by posts 11, which are affixed to and which are upstanding from said base plate, is a fixed guide plate 12; said guide plate being thus spaced, at a suitable elevation, above and parallel to the plane of said base plate. Provided in said guide plate 12 are a plurality of spaced parallel guide slots 13, which, as illustratively shown, are disposed to extend longitudinally therethrough.

Mounted on said fixed guide plate 12, for sliding movement thereon in the plane thereof, is a carriage plate 14. Said carriage plate is provided with a plurality of spaced parallel guide slots 15 which, as illustratively shown, are disposed to extend transversely therethrough. Said guide slots 15 are spaced apart at distances corresponding or equal to the spacing of the guide slots 13 of the fixed guide plate 12, and said guide slots 15 cross or intersect the guide slots 13 at right angles.

Means to couple said carriage plate 14 with said fixed guide plate 12 subject to universal movement relative to the latter and in the plane thereof comprises a top keeper plate 16 which overlies said carriage plate 14 and a bottom keeper plate 17 which underlies said fixed guide plate 12. Extending between said top and bottom keeper plates 16 and 17, so as to respectively pass through the respective intersections of the guide slots 13 and 15 of the respective fixed guide plate 12 and carriage plate 14, are vertical cross pins 18. Said cross pins 18 are provided at their respective ends with screw threaded diametrically reduced extensions 19 to pass through the top and bottom keeper plates 16 and 17. Said reduced extensions provide shoulders at their junctures with the main bodies of the cross pins 18 against which the top and bottom plates 16 and 17 abut, and whereby the latter are relatively spaced so that the surfaces thereof opposed to the exterior surfaces of the fixed guide plate 12 and the carriage plate 14 are maintained in the planes of the latter subject to relative free sliding movement with a minimum of friction. Said top and bottom keeper plates 16 and 17 are secured to said cross pins 18 by nuts 20 which are screwed upon the exteriorly projecting end portions of said reduced extensions 19, or the same may be secured in assembled relation to the cross pins 18 in any other suitable manner. Rotatably mounted on said cross pins 18 are upper and lower anti-friction rollers 21 and 22. The upper rollers 21 engage the sides of guide slots 15 of the carriage plate 14, while the lower rollers 22 engage the sides of the guide slots 13 of the fixed guide plate 12; thus providing anti-friction bearings between the cross pins 18 and said carriage plate and fixed guide plate.

Suitably affixed to the ends of said carriage plate 14, to project therefrom in opposite directions, are handle arms 23. Affixed to the free end portions of said handle arms 23 are upstanding finger pieces or handles 24 which may be grasped by the operator to manually actuate and move the carriage plate 14 in any desired direction in the single plane to which its operative movement is restricted.

Suitably affixed to the sides of said carriage plate 14, to project therefrom in opposite directions, are bracket pieces 25. Said bracket pieces 25 are provided at their outer free ends with offset vertically disposed bearing yokes 26. Rotatably mounted by its journals 27 in and between the ears 28 of one of said bearing yokes 26 is a perpendicularly disposed tracer roller 29. Rotatably mounted, in like manner, in and between the ears 30 the other bearing yoke 26 is a cylindrical grinder element 31 with which is operatively and suitably coupled a flexible drive shaft 32, whereby the same may be operatively and rotatably driven from any suitable source of power.

Affixed on said base plate 10, in position opposed to field of movement of said tracer roller 29, is means for fixedly supporting and holding a specimen, model or pattern of the article, thing or part desired to be duplicated. This supporting and holding means may be variously formed so as to adapt it to correspond or conform to the specimen, model or pattern to be operatively supported and held thereby; and said supporting and holding means includes a manipulatable clamp means for fixedly securing the specimen, model or pattern thereto. Illustrative of one form of this supporting and holding means which, as shown, is adapted to hold a specimen, model or pattern of a commutator brush having an end face conformation desired to be duplicated in dressing old or new brushes, the same comprises a holder standard 33 which is affixed by its foot piece 34 to the base plate 10. The upper portion of said standard 33 provides a fixed clamp jaw 35 from the base of which projects a supporting shelf or saddle 36. Opposed to said fixed clamp jaw 35 is a movable clamp jaw 37, the same being carried by a swinging arm 38 pivotally connected to the base plate 10 by a bearing knuckle 39 affixed to the latter. Pivotally anchored to the standard 33 by a bearing knuckle 40 affixed thereto, is an outwardly extending clamp screw 41, the outer free end portion of which projects through a slot 42 in the arm 38. Engaged on said clamp screw 41 is a clamp nut 43, which may be turned thereon to bear against the arm 38 so as to swing the same inward to carry the movable clamp jaw 37 into gripping and holding relation to the specimen, model or pattern mounted in the supporting and holding means.

Affixed on said base plate 10, in position opposed to the field of movement of the grinder element 31, is a similar supporting and holding means for the work desired to be duplicated in correspondence to a given specimen, model or pattern. In the illustrative form of this work supporting and holding means as shown, the same also comprises a standard 33' affixed by its foot piece 34' to the base plate 10 and having at its upper end a fixed clamp jaw 35' and cooperating supporting shelf or saddle 36'. Operatively opposed to the fixed clamp jaw 35' is a movable clamp jaw 37' supported by its swinging arm 38' from a bearing knuckle 39' on the base plate 10. Pivotally connected to the standard 33' by the bearing knuckle 40' is a clamp screw 41' arranged to extend through a slot 42' in the arm 38' so as to receive the actuating clamp nut 43', which, when properly turned, will swing inwardly said arm 38' so as to carry the movable clamp jaw 37' into gripping and holding relation to the work mounted in said supporting and holding means.

To illustrate the use and operation of the apparatus of this invention as above described, the functioning thereof in dressing the end of a commutator brush body in correspondence to the predetermined end face curvature of finished specimen or pattern member will now be described. The finished specimen or pattern member P, having an end face F of predetermined desired curvature, is mounted on the supporting shelf or saddle 36 of one supporting and holding means and immovably secured thereto between the fixed and movable clamp jaws 35 and 37, with its curved end face F projected in opposition to the tracer roller 29 carried by one side of the carriage plate 14. The commutator brush body or work W, the end of which is desired to be dressed to correspond in curvature to the end face curvature F' of the specimen or pattern P, is mounted on the supporting shelf or saddle 36' of the other supporting and holding means, and immovably secured thereto between the fixed and movable clamp jaws 35' and 37', with the end to be dressed projected in opposition to the grinder element 31 carried by the other side of said carriage plate 14.

When the specimen or pattern P and the work W are thus fixed on their respective supporting and holding means, and power for rotating the grinder element 31 is supplied thereto through the flexible shaft 32, the operator grasps the finger pieces or handles 24, by means of which the carriage plate 14 may be moved, and thereupon slides the latter to a position which will bring the tracer roller 29 into engagement with the curved end face F of the specimen or pattern P, whereby the rotating grinder element 31 is simultaneously brought into operative engagement with the end of the work W to be dressed. Owing to the fact that the carriage plate 14 is capable of universal movement in a single plane, the operator may so manipulate the same as to cause the tracer roller 29 to maintain contact with and to traverse the curved end face F of the specimen or pattern P, and since the rotating grinding element 31, as carried by the carriage plate 14, will be caused to follow a precisely similar path of movement, the abrasive surface of said grinding element will cut away the end of the work W until the end face curvature F' thereof corresponds exactly to that of the specimen or pattern end face F.

The carriage plate 14, due to the coupling means provided between the same and the fixed guide plate 12, which coupling means cooperates with the intersecting guide slots 15 and 13 of said plates, so guides and controls the carriage plate movement as to both hold the tracer roller and grinding element in constant parallel and corresponding positions during the carriage plate movement, as well as to assure corresponding universal movement in a single plane of these parts. Consequently, whatever regular or irregular path of movement is traversed by the tracer roller, as guided by a given specimen or pattern will be correspondingly and simultaneously traversed by the grinding element. Furthermore, the multiple point, and preferably anti-friction, engagement of the coupling means with the carriage plate and fixed guide plate assures a smooth and easy movement of the carriage plate, and the tracer roller and grinding element carried thereby, which is free from loose play, vibration or chattering, thus assuring accurately true cutting effects of the grinding element in correspondence to the pattern to be duplicated.

It will be obvious that form of the tracer device, exemplified by the tracer roller 29, and the form of the cutting device, exemplified by the grinding element 31, may be variously modified to suit the same to the particular kind of work to be done.

From the above description it will be apparent that this invention provides a very simple, inexpensive and easily manipulatable apparatus for duplicating in work operated upon desired contours of a specimen, model or master pattern.

I am aware that various changes can be made and apparently more or less widely different embodiments of this invention could be made without departing from the scope thereof as defined in the following claims. It is therefore intended that all matter contained in the above description or shown in the accompanying drawing shall be interpreted as illustrative and not in a limiting sense.

I claim:

1. Apparatus of the kind described comprising, a base plate, a fixed guide plate supported from said base plate and having parallelly spaced slots therein, a carriage plate slidably movable over said guide plate and having parallelly and correspondingly spaced slots therein disposed at right angles to the slots of said guide plate, means for coupling said carriage plate to said guide plate whereby the latter may be universally moved in a single plane, said coupling means including cross pins respectively engaged through the respective intersections of the slots of said guide and carriage plate, a tracer means carried by said carriage plate, a power driven grinding element also carried by said carriage plate, and spaced means affixed to said base plate respectively adapted to support and hold a pattern and work to be duplicated from said pattern, whereby the pattern is presented subject to engagement by said tracer means while the work is presented subject to corresponding and simultaneous engagement by said grinding element.

2. Apparatus of the kind described comprising, a base plate, a fixed guide plate supported from said base plate and having parallelly spaced slots therein, a carriage plate slidably movable over said guide plate and having parallelly and correspondingly spaced slots therein disposed at right angles to the slots of said guide plate, means for coupling said carriage plate to said guide plate whereby the latter may be universally moved in a single plane, said coupling means including cross pins respectively engaged through the respective intersections of the slots of said guide and carriage plates, said carriage plate having handle means for manipulating the same, bracket members extending from said carriage plate, a tracer means supported by one said bracket member, a power driven rotatable grinding element supported by the other bracket member, and spaced means affixed to said base plate respectively adapted to support and hold a pattern and work to be duplicated from said pattern, whereby the pattern is presented subject to engagement by said tracer means while the work is presented subject to corresponding and simultaneous engagement by said grinding element.

3. In apparatus of the kind described as defined in claim 1, wherein said cross pins are each provided with a pair of anti-friction rollers, one said roller being engageable with the walls of a carriage plate slot and the other said roller being engageable with the walls of a guide plate slot.

4. In apparatus of the kind described as defined in claim 1, wherein the pattern and work supporting and holding means each comprise a support and cooperating clamp jaws, at least one of said clamp jaws being movable relative to the other, and releasable means for moving said movable jaw to and holding the same in clamping position.

5. In apparatus of the kind described as defined in claim 2, wherein the pattern and work supporting and holding means each comprise a support and cooperating clamp jaws, at least one of said clamp jaws being movable relative to the other, and releasable means for moving said movable jaw to and holding the same in clamping position.

EUGENE A. BAERER.